UNITED STATES PATENT OFFICE.

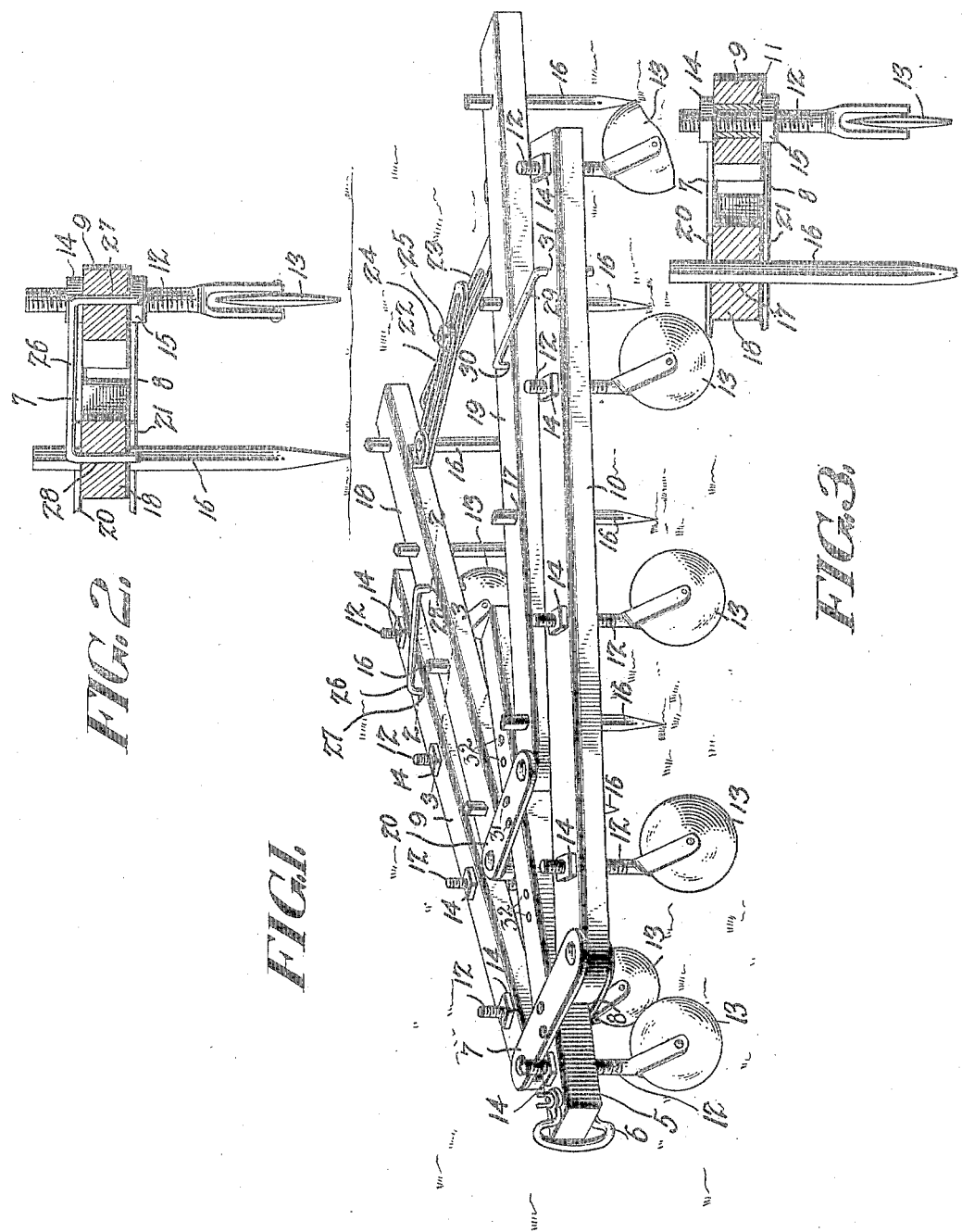

HIRAM ROWAN, OF LIVERMORE, KENTUCKY.

HARROW.

No. 802,324.            Specification of Letters Patent.            Patented Oct. 17, 1905.

Application filed April 7, 1902. Serial No. 101,717.

*To all whom it may concern:*

Be it known that I, HIRAM ROWAN, a citizen of the United States, residing at Livermore, in the county of McLean, State of Kentucky, have invented certain new and useful Improvements in Harrows; and I do hereby declare the following to be a full, clear, and exact description of the invention, such as will enable others skilled in the art to which it appertains to make and use the same.

This invention relates to harrows, and more particularly to the class of combined harrows and pulverizers; and it has for its object to provide a construction in which the width of a harrow may be easily and quickly adjusted to vary the fineness of the earth after it is treated, a further object of the invention being to so construct and arrange the parts of the harrow that this adjustment in width may be effected and the parts clamped in their adjusted positions through the medium of a single bolt.

A further object of the invention is to provide a construction in which the distances of the harrow-teeth behind the pulverizing-disks may be varied without changing the width of the implement.

In the drawings forming a portion of this specification, and in which like numerals of reference indicate similar parts in the several views, Figure 1 is a perspective view of the implement. Fig. 2 is a section on line 2 2 of Fig. 1. Fig. 3 is a section on line 3 3 of Fig. 1.

Referring now to the drawings, the present implement comprises a central draft-beam 5, at the forward end of which is connected a clevis 6, designed for attachment of a draft appliance, such as a doubletree, and against the upper and lower faces of which beam 5 are secured the plates 7 and 8, respectively.

The plates 7 and 8 project with their ends beyond the side faces of the beam 5, and between each pair of projecting ends is pivoted a side beam. The side beams are shown at 9 and 10 and for purposes of distinction in the description of the implement will be referred to as the "pulverizer-beams," for the reason that they carry the pulverizing-disks.

Through the beams 9 and 10 are formed perforations 11, having bushings or linings therein, as illustrated, and through each of these bushings is engaged the stem 12 of a caster-wheel, the wheel itself being in the form of a disk 13, having a sharp edge, so that it may cut through the clods. The stems of the caster-wheels are rotatable in the perforations 11 and are screw-threaded, and engaged with the stems above and below the beams are nuts 14 and 15, which prevent longitudinal displacement of the stems under working conditions, but permit of adjustment of the stems for proper positioning of the pulverizer wheels or disks with respect to the lower ends of the harrow-teeth, it being understood that the harrow-teeth gradually wear away to different extents, and for efficient operation of the implement the teeth and disks should have the same correlative projections.

The harrow-teeth are shown at 16 and are of the usual form and are engaged with their upper ends in perforations 17 in the harrow-beams 18 and 19. The forward ends of the harrow-beams are pivoted between the upper and lower plates 20 and 21, which are secured to the draft-beam 5 in the rear of the plates 7 and 8.

To hold the beams 18 and 19 at different angles to each other, so as to vary the width of the harrow and the spacing of the paths of the teeth, slotted plates 22 and 23 are connected to the beams 18 and 19 and project inwardly therefrom and overlap, and through these slotted plates is engaged a clamping-bolt 24, provided with a clamping-nut 25, by means of which the plates may be clamped together to hold the beams 18 and 19 at a fixed angle. By loosening the nut the beams will be permitted to be moved toward or away from each other.

In order that the beams 9 and 10 may be moved pivotally with the beams 18 and 19, the beams 9 and 18 are connected by a U-shaped bar 26, the ends of which are loosely engaged in perforations 27 and 28 in said beams, while a second U-shaped bar 29 has its arms pivotally engaged in perforations 30 and 31 in the beams 10 and 19. Thus when the beams 18 and 19 are adjusted toward and away from each other the beams 9 and 10 will be correspondingly moved.

In the beam 5, directly in the rear of the clevis 6, is pivotally mounted the stem 12 of a disk 13.

The operation of the pulverizing-disks and also of the harrow-teeth is well understood, and it will be seen that when the angle of the beams 18 and 19 is broadened the paths traced by the teeth and disks will lie farther apart than when the angle between said beams is decreased. Furthermore, a single clamping-bolt when loosened permits of adjustment of the entire implement and when tightened clamps the entire implement against displacement of its parts. The plates 20 and 21 are held in place by removable bolts 31, which engage perforations 32 through the draft-beam 5. By removing these bolts plates 20 and 21, with the attached parts, may be disconnected from the draft-beam, so that the disks 13 may be used alone, while the different perforations 32 permit of attaching the beams 17 and 18 with the teeth 16 at different distances behind the disks to secure the most efficient results under different circumstances.

What is claimed is—

In a harrow, the combination with a draft-beam, of a pair of front and rear harrow-bars at each side of the beam and loosely trailing therefrom, each pair of bars having corresponding upright perforations in the tops thereof, substantially U-shaped links having their sides loosely and removably received in the respective openings to maintain the bars spaced, and an adjustable spacing connection between the rear bars.

In testimony whereof I affix my signature in presence of two witnesses.

HIRAM ROWAN.

Witnesses:
C. A. SHAVER,
C. W. THOMASSON.